United States Patent
Gensler, Jr. et al.

(10) Patent No.: US 10,078,553 B2
(45) Date of Patent: Sep. 18, 2018

(54) POINT IN TIME COPY TECHNIQUE USING A BLOCK LEVEL OF GRANULARITY

(71) Applicant: International Business Machines Corporation, Armonk, NY (US)

(72) Inventors: Robert S. Gensler, Jr., Vail, AZ (US); Ernesto E. Figueroa, Sahuarita, AZ (US); Jeffrey R. Suarez, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 84 days.

(21) Appl. No.: 14/744,004

(22) Filed: Jun. 18, 2015

(65) Prior Publication Data
US 2016/0371023 A1    Dec. 22, 2016

(51) Int. Cl.
*G06F 12/00* (2006.01)
*G06F 11/14* (2006.01)

(52) U.S. Cl.
CPC ...... *G06F 11/1435* (2013.01); *G06F 11/1402* (2013.01); *G06F 12/00* (2013.01); *G06F 11/1446* (2013.01)

(58) Field of Classification Search
CPC .................................................. G06F 12/00
USPC ............................................................. 711/162
See application file for complete search history.

(56) References Cited

U.S. PATENT DOCUMENTS

| | | | |
|---|---|---|---|
| 6,076,148 A * | 6/2000 | Kedem | G06F 11/1466 711/162 |
| 8,074,035 B1 | 12/2011 | Per et al. | |
| 8,612,382 B1 | 12/2013 | Patel et al. | |
| 8,620,973 B1 * | 12/2013 | Veeraswamy | G06F 17/30088 707/639 |
| 8,818,962 B2 | 8/2014 | Mandagere et al. | |
| 2003/0033308 A1 * | 2/2003 | Patel | G06F 11/1076 |
| 2008/0294696 A1 * | 11/2008 | Frandzel | G06F 3/0608 |
| 2009/0055607 A1 * | 2/2009 | Schack | G06F 11/1435 711/162 |
| 2012/0296864 A1 * | 11/2012 | Adari | G06F 17/30073 707/609 |
| 2013/0117514 A1 * | 5/2013 | Gunda | G06F 17/30138 711/162 |
| 2014/0181579 A1 | 6/2014 | Whitehead et al. | |

* cited by examiner

*Primary Examiner* — Gautam Sain
(74) *Attorney, Agent, or Firm* — Zilka-Kotab, P.C.

(57) ABSTRACT

A method is provided for performing a point in time copy using a block level of granularity. The method includes identifying an index node for a file, and translating data block locations identified by the index node to physical track locations. Further, the method includes performing a point in time copy utilizing the physical track locations.

17 Claims, 4 Drawing Sheets

POINT IN TIME COPY TECHNIQUE USING A BLOCK LEVEL OF GRANULARITY

BACKGROUND

The present invention relates to performing backups, and more specifically, this invention relates to creating a point in time copy of a file using a block level of granularity.

During a backup of data, applications must prevent the data from being updated. If the data is updated during the backup, then it may not be possible to obtain a consistent backup. The length of time updates to the data must be prevented for may depend on an amount of the data being backed-up. Thus, for large quantities of data, applications may not be able to process updates to the data for an extended period of time.

Today, on count key data (CKD) devices, point in time copy techniques, such as Concurrent Copy or FlashCopy, are used to take consistent point in time backups of mainframe data. The use of a point in time copy technique may essentially eliminate the amount of time a data set is unavailable to users and applications. However, due to the mechanism by which such point in time copy techniques work, large amounts of drive space may be necessary to perform such backups.

When backing up Unix files, an administrator may create backups of files from a file system clone. Cloning a file system is also a point in time copy technique, but it is managed by software rather than a storage subsystem. File system cloning may reduce the time a file is unavailable for updates, just as hardware based point in time copy techniques, but it is a two-step process. Further, file system cloning does not allow performance of backup, recovery, or migration at file-level granularity.

Additionally, users may prefer relying on fewer products for disaster recovery, with file level granularity and policy-based automation in order to meet better RPO (Recovery Point Objective) and lower RTO (Recovery Time Objective).

BRIEF SUMMARY

A method is provided for performing a point in time copy using a block level of granularity. The method includes identifying an index node for a file, and translating data block locations identified by the index node to physical track locations. Further, the method includes performing a point in time copy utilizing the physical track locations.

Additionally, a computer program product is provided for performing a point in time copy using a block level of granularity. The computer program product comprises a computer readable storage medium having program instructions embodied therewith. The program instructions are executable by a processor to cause the processor to identify an index node for a file, and translate data block locations identified by the index node to physical track locations. Further, the program instructions are executable by the processor to cause the processor to perform a point in time copy utilizing the physical track locations.

Still yet, a system is provided for performing a point in time copy using a block level of granularity. The system comprises a processor and logic integrated with and/or executable by the processor. The logic is configured to cause the processor to identify an index node for a file, and translate data block locations identified by the index node to physical track locations. The logic is further configured to cause the processor to perform a point in time copy utilizing the physical track locations.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for creating a point in time copy of data using a block level of granularity.

In one general embodiment, a method is provided for performing a point in time copy using a block level of granularity. The method includes identifying an index node for a file, and translating data block locations identified by the index node to physical track locations. Further, the method includes performing a point in time copy utilizing the physical track locations.

In another general embodiment, a computer program product is provided for performing a point in time copy using a block level of granularity. The computer program product comprises a computer readable storage medium having program instructions embodied therewith. The program instructions are executable by a processor to cause the processor to identify an index node for a file, and translate data block locations identified by the index node to physical track locations. Further, the program instructions are executable by the processor to cause the processor to perform a point in time copy utilizing the physical track locations.

In another general embodiment, a system is provided for performing a point in time copy using a block level of granularity. The system comprises a processor and logic integrated with and/or executable by the processor. The logic is configured to cause the processor to identify an index node for a file, and translate data block locations identified by the index node to physical track locations. The logic is further configured to cause the processor to perform a point in time copy utilizing the physical track locations.

Figure 1:
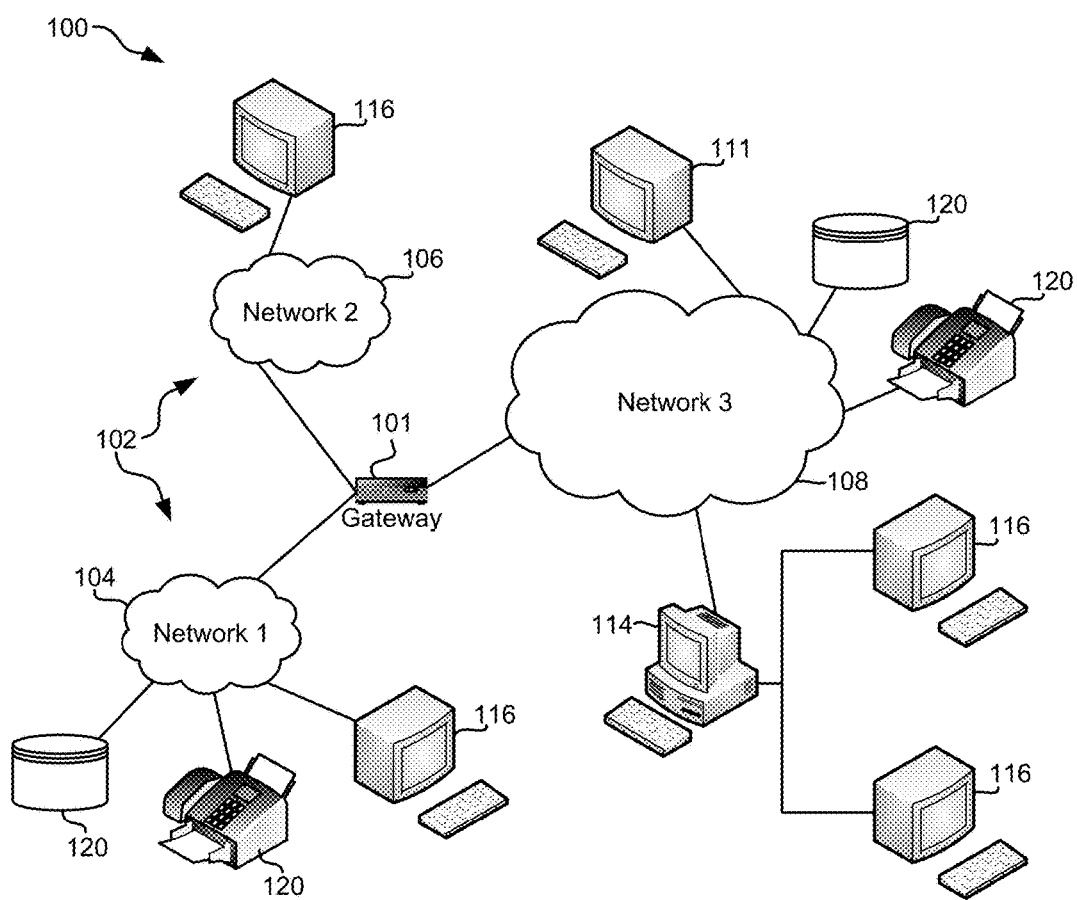
FIG. 1 illustrates a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
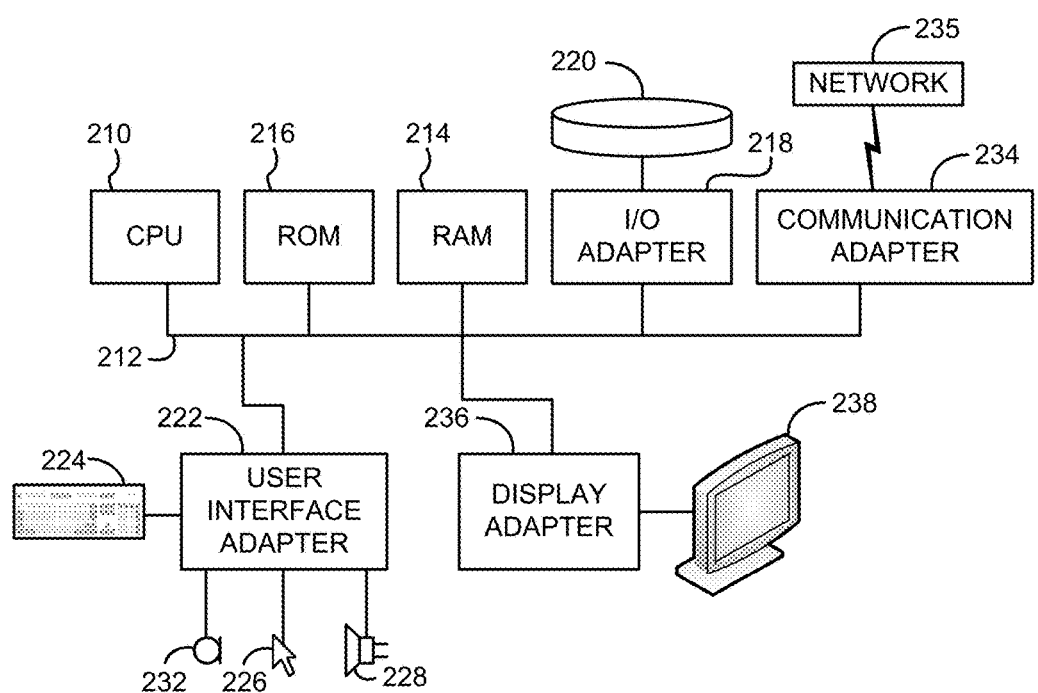
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
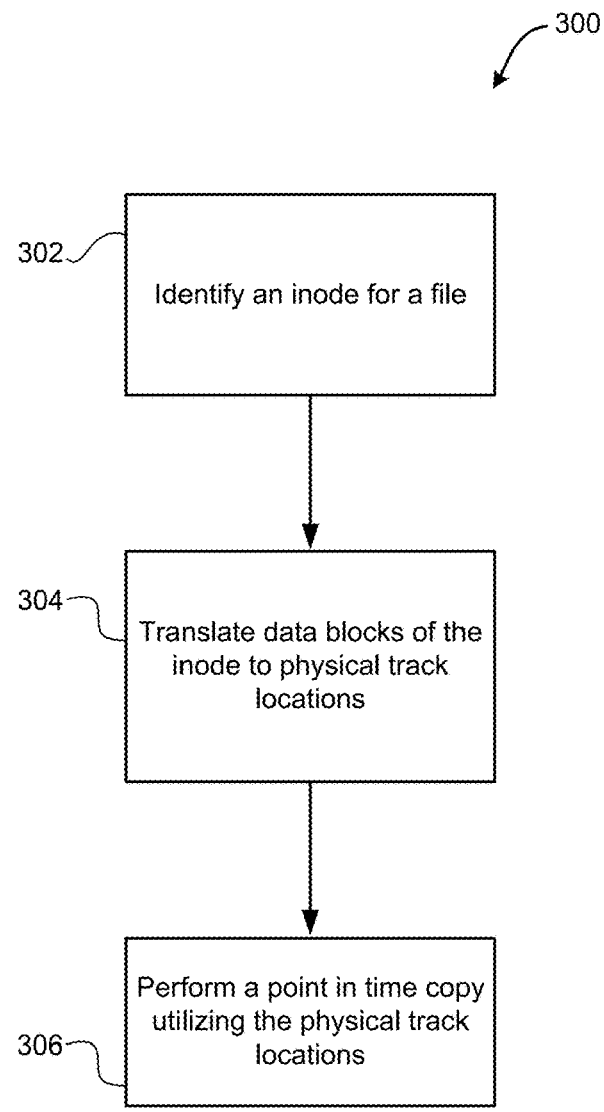
FIG. 3 illustrates a method for performing a point in time copy using a block level of granularity, in accordance with one embodiment.

Now referring to FIG. 3, a flowchart of a method 300 for performing a point in time copy using a block level of granularity is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where an index node is identified for a file. As used herein, a file may include any collection of stored data that is treated as a unit. In one embodiment, the data may include logically related records. Further, an index node, which may also be referred to herein as an "inode," may comprise a data structure that represents a file system object, such as a file or directory. In one embodiment, the inode stores one or more data block locations or data block addresses of the data that comprises the file system object.

In various embodiments, the data blocks of a file system may be numbered sequentially, such that the data blocks are numbered relative to each other. The data blocks of the file system may be consecutively numbered from a beginning of the file system, to a last block of the file system. In such embodiments, the inode for a file may identify the relative addresses of the data blocks that contain the data comprising the file.

In another embodiment, one or more data blocks identified by the data block locations in the inode may store block addresses for a plurality of additional data blocks that comprise the file. Such data blocks may be referred to as level 1 indirect blocks. Still yet, one or more data block locations identified in the inode may store block addresses for a plurality of additional data blocks, and each of the additional blocks may store block addresses for a plurality of yet additional data blocks that comprise the file. Such data blocks may be referred to as level 2 indirect blocks.

Through the use of various levels of direct and indirect blocks, an inode for a large file may indirectly identify all block addresses storing data for the file without increasing the size of the inode. However, as a consequence of such a system, not all data blocks for a given file may be identified directly within an inode, or even at the same level within such an indirect block locating structure.

It should be noted that for purposes of simplicity, the method 300 is described in the context of a "file," however it is contemplated that the method 300 could be implemented in the same manner as described herein for performing a copy of a directory or any other file system object.

Further, at operation 304, data block locations identified by the inode are translated to physical track locations. In the context of the present description, a track may comprise any physical band of data located on a storage medium. For example, tracks may comprise linear bands of data on a tape, or concentric rings of data on hard disk. Further, the track may be divided, and sub-divided, into discrete segments or blocks along the track. In other words, translating the data block locations identified by the inode may include creating a track map that includes a mapping of the file at a track level. In one embodiment, all of the data block locations identified by the inode may be utilized to generate the track mapping.

In one embodiment, the mapping of the file at the track level may correspond to tracks in a linear data set, such as a Virtual Storage Access Method (VSAM) linear data set. Each of the tracks in a given linear data set may comprise a fixed number of blocks. For example, each track of a linear data set may comprise seven blocks. Of course, the methods and systems described herein may be applicable to tracks having any number of blocks.

In one specific example, each track of a plurality of data tracks of a storage medium may comprise seven data blocks. In such an embodiment, a relative block address may be provided as Z. The relative block address provided as Z may be converted, at least in part, to a physical track location by evaluating the expression "Z mod 7." Accordingly, a modulus operation may be performed to map a block address to a physical track location.

Of course, however, the data block addresses identified using the index node may be converted to physical track locations in any manner.

In one embodiment, after creating a track map by translating the data block locations to physical track locations, the track map may be evaluated to ensure that no tracks are duplicated in the map. If any track is duplicated in the track map, then the track map may be modified to identify only a single instance of the duplicated track. For example, if a plurality of block addresses, which are identified directly or indirectly using the inode, resolve to a plurality of data blocks on the same physical track, then the track map may be modified to only identify a single instance of that track.

In this way, a track map may identify each track that at least a portion of a file is stored on.

In some embodiments, once the track map is created by mapping data blocks to physical track locations, and the tracks are established, then at that point any application that requests access to the file, such as a read or write operation, may be permitted.

Still yet, at operation 306, a point in time copy is performed utilizing the physical track locations. The point in come copy may effectively backup a file utilizing a track map that identifies each track in a file system that stores data for the file.

In one embodiment, the point in time copy may be performed using any snapshot utility that records a state of a file at a given moment, and preserves that recording for use in a later recovery operation. For example, the point in time copy may be performed using software such as IBM Flash-Copy or IBM Concurrent Copy. In this manner, a point in time copy of a single file may be generated under the control of a device or disk controller without utilizing functionality provided by operating system.

Additionally, in this manner a point in time copy of a single file may be generated without locking the file and preventing application read and/or write access. In prior art backup systems, it may be necessary to lock a file prior to performing a backup, traverse the file system to locate all of the blocks, and then copy them to the backup copy of the file. Because of the lock, any application that requires use of the file may lose the ability to read or write the file during the backup process. This may be increasingly problematic as file size increases, and more blocks are made inaccessible to applications that intend to read or write the file.

Moreover, unlike traditional point in time copy techniques that utilize pointers and duplicated data blocks in order to allow application write access during copy operations, the embodiments described herein do not require the duplication of data blocks in order to ensure the integrity of the point in time copy. As data sets and files grow in size, it becomes increasingly valuable to avoid the unnecessary duplication of data within a storage medium. Avoiding such duplication preserves the integrity of the file system, and ensures that blocks remain available for allocation and storage of other, non-duplicitous, data within the file system.

Figure 4:
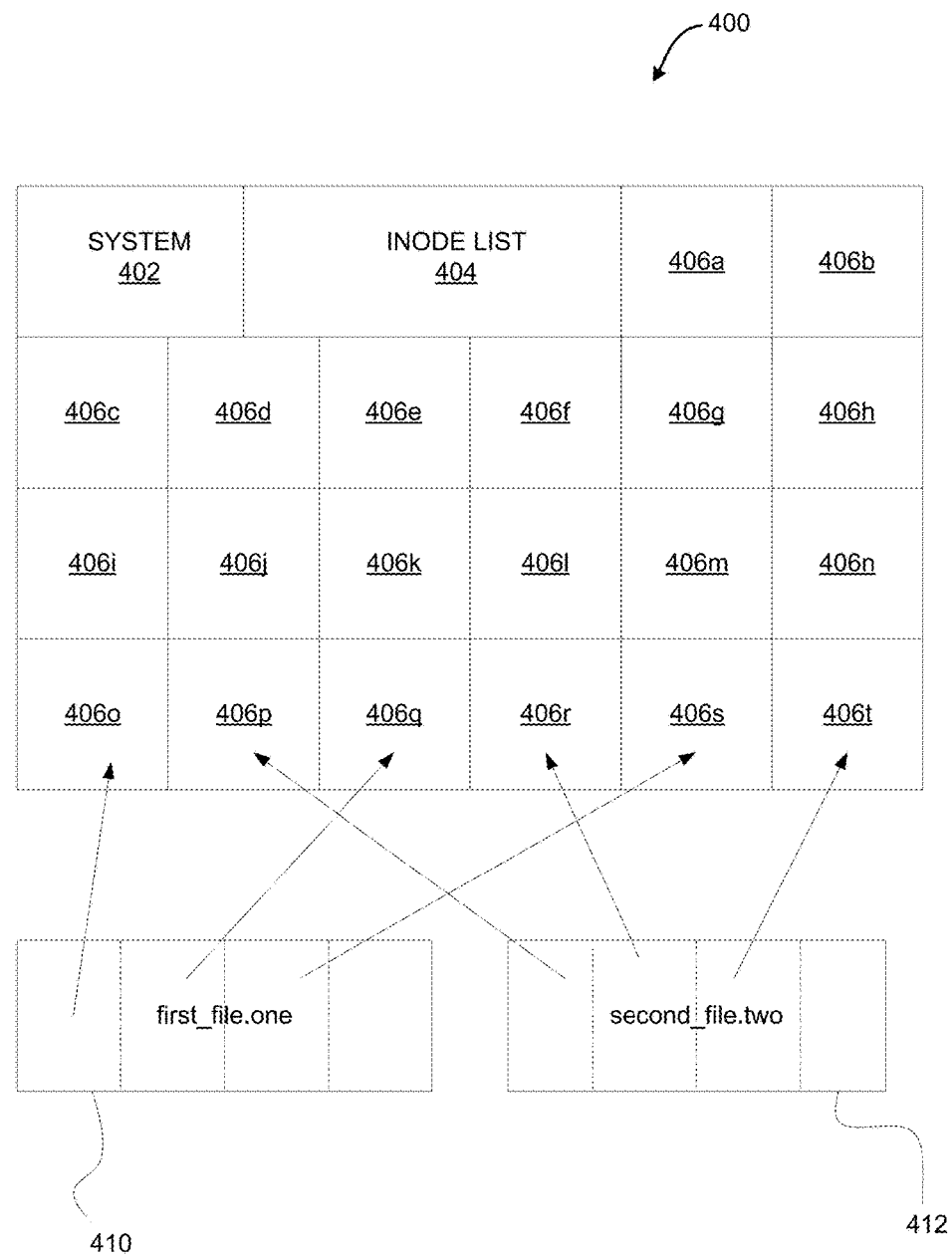
FIG. 4 illustrates a data set, in accordance with another embodiment.

FIG. 4 depicts a data set 400, in accordance with one embodiment. As an option, the data set 400 may be implemented in conjunction with features from any other embodiment listed herein, such as those described with reference to the other FIGS. Of course, however, such data set 400 and others presented herein may be used in various applications and/or in permutations which may or may not be specifically described in the illustrative embodiments listed herein. Further, the data set 400 presented herein may be used in any desired environment.

As shown in FIG. 4, the data set 400 includes a file system 401. In various embodiments, the data set 400 may be a linear data set. The file system 401 is shown to include system data 402, an inode list 404, and data blocks 406. As illustrated in FIG. 4, the data blocks 406 of the file system 401 are shown to comprise data blocks 406a-406t. In one embodiment, the system data 402 may include a boot sector. In another embodiment, the system data 402 may include disk information (e.g., disk size, sector sizes, owner, etc.) and/or a location of a root directory. Further, in one embodiment, the inode list 404 may comprise all the inodes required for accessing the data stored to the file system 401.

Moreover, the file system 401 is shown to store the contents of at least two files, a first file 410 and a second file 412. As files of the file system 401 are created and allocated, the file system 401 may identify free data blocks for storing data of the files. Because data blocks of a file are assigned as the file requires them, the data blocks of the file may not be consecutive blocks on a data track, or even on the same track of a physical medium. As a result, the data blocks comprising a given file may be contiguous, or they may not be contiguous. Further, the data blocks comprising a file may be spread about among any number of tracks of a data set, such that there may be multiple blocks of a file in a track, or just a single block per track. Consequently, each track may have multiple blocks that are associated with multiple inodes, where each of the inodes may be associated with a file or a directory. Further, the data blocks of a given file may be somewhere near the beginning of relative blocks, or they may be somewhere far away from each other.

As shown in FIG. 4, the first file 410 is comprised of the data blocks 406o, 406q, and 406s, which are non-contiguous in the file system 401. Further, the second file 412 is comprised of the data blocks 406p, 406r, and 406t, which are also non-contiguous.

In the context of the method 300 of FIG. 3, a backup of the first file 410 may proceed as follows. First, an index node for the first file 410 is identified. The index node for the first file 410 may identify each of the data blocks 406o, 406q, and 406s. In one embodiment, the data blocks 406o, 406q, and 406s may be identified by way of direct pointers. In another embodiment one or more of the data blocks 406o, 406q, and 406s may be identified by way of one or more indirect pointers. Further, data block locations for each of the data blocks 406o, 406q, and 406s are then translated or mapped to physical track locations. In one embodiment, if there are any duplicated physical track locations, the duplicates may be removed. Further, a point in time copy is then performed utilizing the physical track locations.

In one embodiment, each of the data blocks 406o, 406q, and 406s may reside on the same physical track. In such an embodiment, the point in time copy may utilize only the single physical track. In another embodiment, the data blocks 406o, 406q, and 406s may reside on two or more physical tracks. In such an embodiment, the point in time copy may utilize each of the two or more physical tracks. Further, for efficiency, the point in time copy may utilize only the physical tracks that have been mapped to based on the translated data block locations.

The second file 412 may be backed up in a similar manner, utilizing a mapping of the physical track locations that store data of the second file 412.

In this manner, a point in time copy of a file may be obtained in a way that maintains the integrity of the file at the point in time the backup was requested. Further, in this manner, a file does not need to be locked, which would otherwise prevent access to the file by other executing applications. Still yet, in this manner, a copy of a file is made without utilizing block pointers or temporary/dummy files that may depend on the undesirable utilization of previously unallocated data blocks. Accordingly, the systems and methods disclosed herein may backup a file in a one-step process by leveraging the point in time copy technology available in modern disk storage subsystems. Additionally, the point in time copy technique disclosed herein may be used to create a backup of an individual file, or a set of files, that span one or more tracks on a CKD device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    identifying, utilizing a processor, an index node for a file, the index node including a data structure that stores a plurality of data block addresses that are numbered relative to each other, where the data block addresses indicate data blocks within a storage medium that contain data comprising the file;
    translating, utilizing the processor, the data block addresses identified by the index node to locations of one or more physical tracks on which the data blocks are located, where each of the one or more physical tracks includes an entire physical band of data located on the storage medium that includes one or more of the data blocks that contain the data comprising the file, where the translating includes:
        determining the data block addresses identified by the index node for the file,
        converting the data block addresses to the locations of the one or more physical tracks, utilizing a modulus operation that includes evaluating B mod A for each of the data block addresses B for the file, where each of the one or more physical tracks includes a fixed number of data blocks A,
        storing the locations of the one or more physical tracks in a track map for the file that maps the data block addresses for the file to the locations of the one or more physical tracks, and
        removing locations of duplicate physical tracks from the track map for the file, such that only a single instance of a duplicated physical track is stored within the track map for the file; and
    performing, utilizing the processor, a point in time copy of the file utilizing the locations of the physical tracks stored within the track map for the file.

2. The method of claim 1, wherein access to the file is permitted after the track map is created.

3. The method of claim 1, wherein at least one data block identified by the data block addresses stores an address of a data block storing additional data block addresses, wherein at least one of the additional data block addresses identifies another address of another data block storing at least a portion of data of the file.

4. The method of claim 1, wherein the locations of the data blocks are non-contiguous.

5. The method of claim 4, wherein translating the data block addresses identified by the index node includes creating the track map.

6. The method of claim 1, wherein:
the track map maps the data block addresses to the locations of the one or more physical tracks,
a plurality of the data block addresses are mapped to a single physical track, and
the track map is modified to only identify a single instance of the single physical track within the track map.

7. The method of claim 1, wherein the index node indicates that a plurality of the data block addresses are located at a single physical track, and the track map is modified such that a location of the single physical track is listed only once within the track map for the file.

8. A computer program product for performing a point in time copy using a block level of granularity, the computer program product comprising a computer readable storage medium that is not a transitory signal per se, the computer readable storage medium having program instructions embodied therewith, the program instructions executable by a processor to cause the processor to:
identify an index node for a file, the index node including a data structure that stores a plurality of data block addresses that are numbered relative to each other, where the data block addresses indicate data blocks within a storage medium that contain data comprising the file;
translate the data block addresses identified by the index node to locations of one or more physical tracks on which the data blocks are located, where each of the one or more physical tracks includes an entire physical band of data located on the storage medium that includes one or more of the data blocks that contain the data comprising the file, where the translating includes:
determining the data block addresses identified by the index node for the file,
converting the data block addresses to the locations of the one or more physical tracks, utilizing a modulus operation that includes evaluating B mod A for each of the data block addresses B for the file, where each of the one or more physical tracks includes a fixed number of data blocks A,
storing the locations of the one or more physical tracks in a track map for the file that maps the data block addresses for the file to the locations of the one or more physical tracks, and
removing locations of duplicate physical tracks from the track map for the file, such that only a single instance of a duplicated physical track is stored within the track map for the file; and
perform a point in time copy of the file utilizing the locations of the physical tracks stored within the track map for the file.

9. The computer program product of claim 8, wherein access to the file is permitted after the track map is created.

10. The computer program product of claim 8, wherein at least one data block identified by the data block addresses stores an address of a data block storing additional data block addresses, wherein at least one of the additional data block addresses identifies another address of another data block storing at least a portion of data of the file.

11. The computer program product of claim 8, wherein the locations of the data blocks are non-contiguous.

12. The computer program product of claim 8, wherein translating the data block addresses identified by the index node includes creating the track map.

13. The computer program product of claim 8, wherein:
the track map maps the data block addresses to the locations of the one or more physical tracks,
a plurality of the data block addresses are mapped to a single physical track, and the track map is modified to only identify a single instance of the single physical track within the track map.

14. The computer program product of claim 8, wherein the index node indicates that a plurality of the data block addresses are located at a single physical track, and the track map is modified such that a location of the single physical track is listed only once within the track map for the file.

15. A system, comprising:
a processor; and
logic integrated with the processor, executable by the processor, or integrated with and executable by the processor, the logic being configured to cause the processor to:
identify an index node for a file, the index node including a data structure that stores a plurality of data block addresses that are numbered relative to each other, where the data block addresses indicate data blocks within a storage medium that contain data comprising the file;
translate the data block addresses identified by the index node to locations of one or more physical tracks on which the data blocks are located, where each of the one or more physical tracks includes an entire physical band of data located on the storage medium that includes one or more of the data blocks that contain the data comprising the file, where the translating includes:
determining the data block addresses identified by the index node for the file,
converting the data block addresses to the locations of the one or more physical tracks, utilizing a modulus operation that includes evaluating B mod A for each of the data block addresses B for the file, where each of the one or more physical tracks includes a fixed number of data blocks A,
storing the locations of the one or more physical tracks in a track map for the file that maps the data block addresses for the file to the locations of the one or more physical tracks, and
removing locations of duplicate physical tracks from the track map for the file, such that only a single instance of a duplicated physical track is stored within the track map for the file; and
perform a point in time copy of the file utilizing the locations of the physical tracks stored within the track map for the file.

16. The system of claim 15, wherein translating the data block addresses identified by the index node includes creating the track map.

17. The system of claim 16, wherein the track map identifies each track that at least a portion of the file is stored on.

* * * * *